Oct. 2, 1923.
C. H. BROWN
FISHING TOOL
Original Filed Oct. 29, 1921
1,469,493
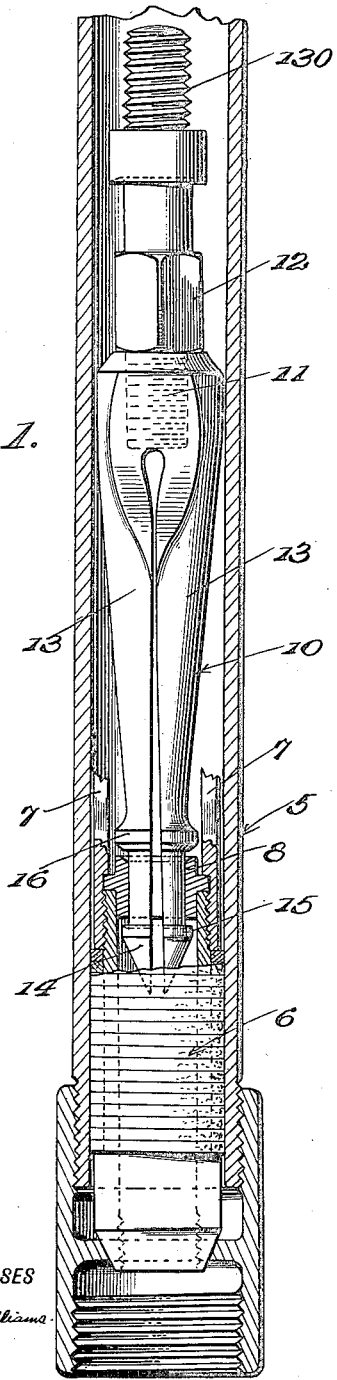
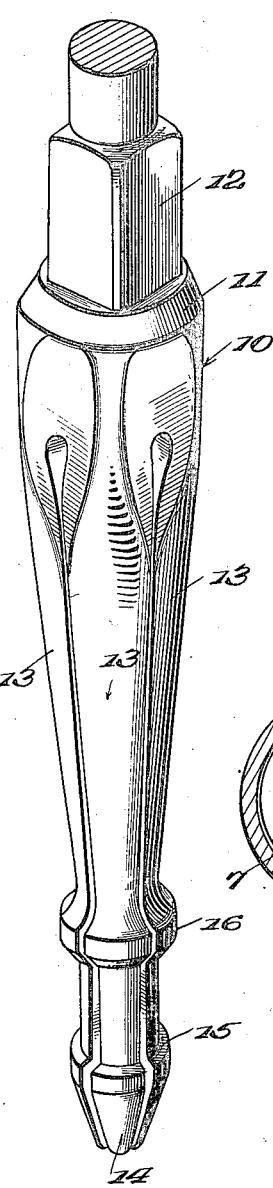
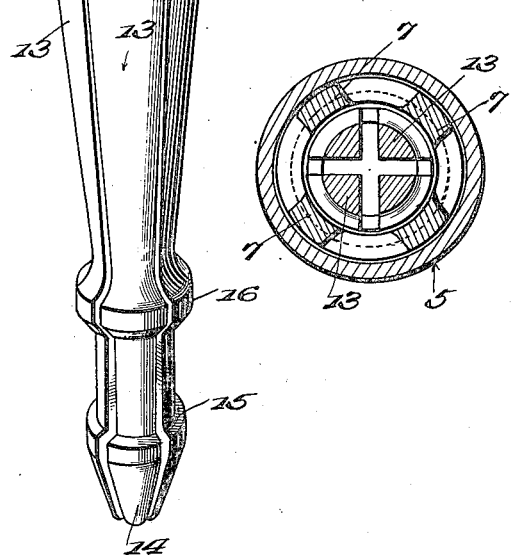
WITNESSES
INVENTOR
C. H. Brown.
BY
ATTORNEYS Patented Oct. 2, 1923.

1,469,493

UNITED STATES PATENT OFFICE.

CHARLES H. BROWN, OF BRECKENRIDGE, TEXAS.

FISHING TOOL.

Application filed October 29, 1921, Serial No. 511,368. Renewed August 16, 1923.

*To all whom it may concern:*

Be it known that I, CHARLES H. BROWN, a citizen of the United States, and resident of Breckenridge, in the county of Stephens and State of Texas, have invented certain new and useful Improvements in Fishing Tools, of which the following is a specification.

This invention relates to fishing tools especially adapted for removing broken valve cages from oil wells.

An important object of this invention is to provide a fishing tool having a plurality of spring arms which diverge toward their forward ends and are provided with means for gripping the valve seat of the valve cage and thereby removing the valve cage on the rearward movement of the tool.

A further object of the invention is to provide a fishing tool which is in the shape of a spear and therefore readily entered into the valve cage when the tool is lowered into the well.

Other objects and advantages of the invention will be apparent during the course of the following description.

In the accompanying drawing, forming a part of this application and in which like numerals are employed to designate like parts throughout the same, Figure 1 is a side elevation of the same arranged within a well, a spring arm being shown engaged with the valve seat for the purpose of removing the valve.

Figure 2 is a perspective of the improved fishing tool.

Figure 3 is a horizontal sectional view through the tool applied.

In the drawing wherein for the purpose of illustration is shown a preferred embodiment of the invention the numeral 5 designates a tubular member or working barrel within which a valve 6 is arranged.

As illustrated in Figure 1 the spaced bars 7 of the valve cage are broken intermediate their ends thereby necessitating the removal of the valve. However, prior to removing the valve 6 the ball which engages the seat 8 is removed by means of a tool especially constructed for that purpose.

In order to remove the valve 6 I employ a tool generally designated by the numeral 10 and which consists of a body 11 having a rearwardly directed squared portion 12 adapted to be engaged by the jaws of a wrench when it is desired to connect the threaded stem 130 with the operating jars. A plurality of spring arms 13 are welded or otherwise connected at their enlarged rear ends to the body 11 and are, as illustrated in Figure 3 segmental or triangular in cross section thereby forming a complete circle. The spring arms 13 have their forward terminal portions pointed as indicated at 14 so that when the tool is lowered into the well the pointed terminal portions 14 will pass through the valve seat 8 and thereby cause the shoulders 15 formed adjacent the forward ends of the arms to engage the valve seat 8. The spring arms 13, of which there are four, are formed with exterior cuts which define the shoulders 15 and a second set of shoulders 16. The space between the shoulders 15 and 16 defines an annular groove which snugly receives the annular valve seat 8 and thereby causes the shoulders 15 to flatly grip the bottom of the valve seat so that when a rearward pull is exerted on the tool the valve 6 will be removed. As illustrated particularly in Figure 3 the spring arms 13 are curved inwardly adjacent their rear ends into contact with each other so that the forward ends of the spring arms are caused to diverge. Therefore the forward ends of the arms 13 are normally arranged in spaced relation to each other, and when the pointed ends 14 which are also segmental in cross section enter the valve seat 8, the arms will be drawn together to permit the shoulders 15 to be engaged with the under side of the valve seat. On the other hand the arcuate shoulders 16 engage the upper side of the valve seat 8° and limit the forward movement of the tool. As soon as the pointed terminal portions 14 of the spring arms enter the valve seat 8 the arms 13 are spread by reason of their resiliency and by reason of the fact that they contact with each other adjacent their rear ends. It might be said that the arms 13 are curved longitudinally and diverge toward their forward ends so that the arms are separated at their forward ends as soon as the pointed terminal portions 14 pass through the valve seat 8.

In operation the improved tool is lowered into the well and the above terminal portions 14 are passed through the valve seat 8 so that the arcuate shoulders 15 may be engaged with the under side of the valve seat 8. At this point a rearward pull may be exerted on the tool with the result that the valve 6 will be withdrawn from the well.

Having thus described the invention what I claim is:—

1. A fishing tool for wells comprising a body having a plurality of longitudinally curved spring arms having their forward portions formed with exterior grooves constituting forward and rear shoulders and an annular valve seat receiving groove, said shoulders being adapted to engage opposite sides of the valve seat of a working valve.

2. A fishing tool for wells comprising a body having a plurality of longitudinally curved spring arms having their forward portions formed with exterior grooves constituting forward and rear shoulders and an annular valve seat receiving groove, said shoulders being adapted to engage opposite sides of the valve seat of a working barrel, the spring arms being segmental in cross section and pointed at their forward ends for movement through the valve seat.

3. A fishing tool for wells comprising a body having a plurality of spring arms tapered to a point at their forward ends and provided with arcuate shoulders, adapted to engage the forward side of a valve seat said arms being reduced rearwardly of said arcuate shoulders thereby defining an annular groove adapted for the reception of a valve seat, said spring arms being provided rearwardly of said groove with a second set of shoulders constituting a means to limit the forward movement of the tool through the valve seat, said arms being segmental in cross section.

4. A fishing tool for removing broken valve cages comprising a plurality of spring arms having pointed segmental forward end portions cooperating to form an approximately cone-shaped member adapted for movement through the valve seat of a valve cage, said arms being formed with front and rear shoulders defining a valve seat receiving groove, the forward shoulders being adapted to flatly engage the forward side of the valve seat and the rear shoulders being adapted to engage the rear side of the valve seat whereby to limit the forward movement of the arms through the valve seat.

CHARLES H. BROWN.